(12) United States Patent
Nakamura et al.

(10) Patent No.: US 10,486,734 B2
(45) Date of Patent: Nov. 26, 2019

(54) STEERING ASSISTANCE DEVICE

(71) Applicant: NABTESCO CORPORATION, Tokyo (JP)

(72) Inventors: Koji Nakamura, Mie (JP); Masahiro Takahashi, Mie (JP); Takashi Naruse, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 236 days.

(21) Appl. No.: 15/371,893

(22) Filed: Dec. 7, 2016

(65) Prior Publication Data
US 2017/0174251 A1    Jun. 22, 2017

(30) Foreign Application Priority Data

Dec. 16, 2015  (JP) .................................. 2015-245240

(51) Int. Cl.
| | | |
|---|---|---|
| *B62D 5/04* | (2006.01) | |
| *B62D 3/12* | (2006.01) | |
| *F16H 1/32* | (2006.01) | |

(52) U.S. Cl.
CPC ......... *B62D 5/0409* (2013.01); *B62D 5/0415* (2013.01); *B62D 5/0421* (2013.01);
(Continued)

(58) Field of Classification Search
CPC .. B62D 5/0409; B62D 5/0415; B62D 5/0421; B62D 5/0442; B62D 3/12
See application file for complete search history.

(56) References Cited

U.S. PATENT DOCUMENTS 6,026,924 A * 2/2000 Godek ..................... B62D 3/12
                                                              180/444
2011/0024223 A1   2/2011 Konrad et al.
(Continued)

FOREIGN PATENT DOCUMENTS

| EP | 0931714 A1 | 7/1999 |
|---|---|---|
| EP | 2242675 B1 | 4/2012 |

(Continued)

OTHER PUBLICATIONS

Extended European Search Report EP Application No. 16202170.3 dated Jun. 21, 2017.
(Continued)

*Primary Examiner* — Kevin Hurley
*Assistant Examiner* — Marlon A Arce
(74) *Attorney, Agent, or Firm* — Pillsbury Winthrop Shaw Pittman, LLP

(57) ABSTRACT

The present application discloses a steering assistance device, including: a motor configured to output a drive force in accordance with a steering force applied to a steering shaft; and a speed reducer including: a gear section configured to rotate and oscillate in accordance with the drive force; an outer cylinder having an internally toothed ring formed thereon, the internally toothed ring being configured to mesh with the gear section; and a carrier configured to rotate in accordance with rotation and oscillation of the gear section and output a steering assistance force to a steering mechanism, the steering mechanism being configured to steer vehicle wheels in accordance with rotational operation applied to a steering wheel. The engagement ratio between the gear section and the internally toothed ring is from 25 to 100%.

10 Claims, 5 Drawing Sheets

(52) U.S. Cl.
CPC .............. *B62D 5/0442* (2013.01); *B62D 3/12* (2013.01); *F16H 1/32* (2013.01)

(56) References Cited

U.S. PATENT DOCUMENTS

| | | | |
|---|---|---|---|
| 2016/0201786 A1* | 7/2016 | Chauvrat | B62D 5/0409 180/444 |
| 2016/0238107 A1 | 8/2016 | Hirota et al. | |
| 2018/0156325 A1* | 6/2018 | Segawa | F16H 1/16 |

FOREIGN PATENT DOCUMENTS

| | | |
|---|---|---|
| JP | 61-252934 A | 11/1986 |
| JP | 6-241282 A | 8/1994 |
| JP | 10-30687 A | 2/1998 |
| JP | 2007-196980 A | 8/2007 |
| JP | 2013-035475 A | 2/2013 |
| WO | 2015/068822 A1 | 5/2015 |
| WO | 2017/042020 A1 | 3/2017 |

OTHER PUBLICATIONS

Notice of Reasons for Refusal dated Sep. 17, 2019 issued in corresponding Japanese Patent Application No. 2015-245240 with English translation.

* cited by examiner

STEERING ASSISTANCE DEVICE

CROSS-REFERENCE TO RELATED APPLICATIONS

This application is based on and claims the benefit of priority from Japanese Patent Application Serial No. 2015-245240 (filed on Dec. 16, 2015), the contents of which are hereby incorporated by reference in their entirety.

TECHNICAL FIELD

The present invention relates to an electric steering assistance device for assisting steering of a driver.

RELATED ART

Steering assistance devices are installed on various vehicles to assist steering of drivers. In Japanese Patent Application Publication No. 2013-35475, there is disclosed a steering assistance device including a torque sensor, a motor, and a speed reducer and configured to transmit a steering assistance force to a steering mechanism.

The torque sensor detects a torque produced in a steering shaft by steering of a driver. The motor produces a driving force in accordance with the detected torque. The driving force is transmitted to the steering mechanism through the speed reducer. Since the speed reducer enlarges the torque transmitted from the motor to the steering mechanism, the driver can steer the vehicle with a light force. In Japanese Patent Application Publication No. 2013-35475, there is disclosed use of planetary gears as a speed reducer.

If a conventional speed reducer is built in a steering assistance device installed on a vehicle having a large weight (e.g., a five-ton truck), the speed reducer is subjected to a very large load. As a result, the meshing of the gears in the speed reducer may yield to the large load, resulting in idling of the gears or damage to the gears.

SUMMARY

One object of the present invention is to provide a steering assistance device that can operate properly under a large load.

A steering assistance device according to one aspect of the present invention comprises: a motor configured to output a drive force in accordance with a steering force applied to a steering shaft; and a speed reducer including: a gear section configured to rotate and oscillate in accordance with the drive force; an outer cylinder having an internally toothed ring formed thereon, the internally toothed ring being configured to mesh with the gear section; and a carrier configured to rotate in accordance with rotation and oscillation of the gear section and output a steering assistance force to a steering mechanism, the steering mechanism being configured to steer vehicle wheels in accordance with rotational operation applied to a steering wheel. An engagement ratio between the gear section and the internally toothed ring is from 25 to 100%. Such a steering assistance device can operate properly under a large load.

Objects, features, and advantages of the above steering assistance device will become apparent from the following detailed description and the accompanying drawings.

DETAILED DESCRIPTION OF THE INVENTION

First Embodiment

The Inventors of the present invention developed a steering assistance device that can operate properly under a large load. The first embodiment is an example of such a steering assistance device.

Figure 1:
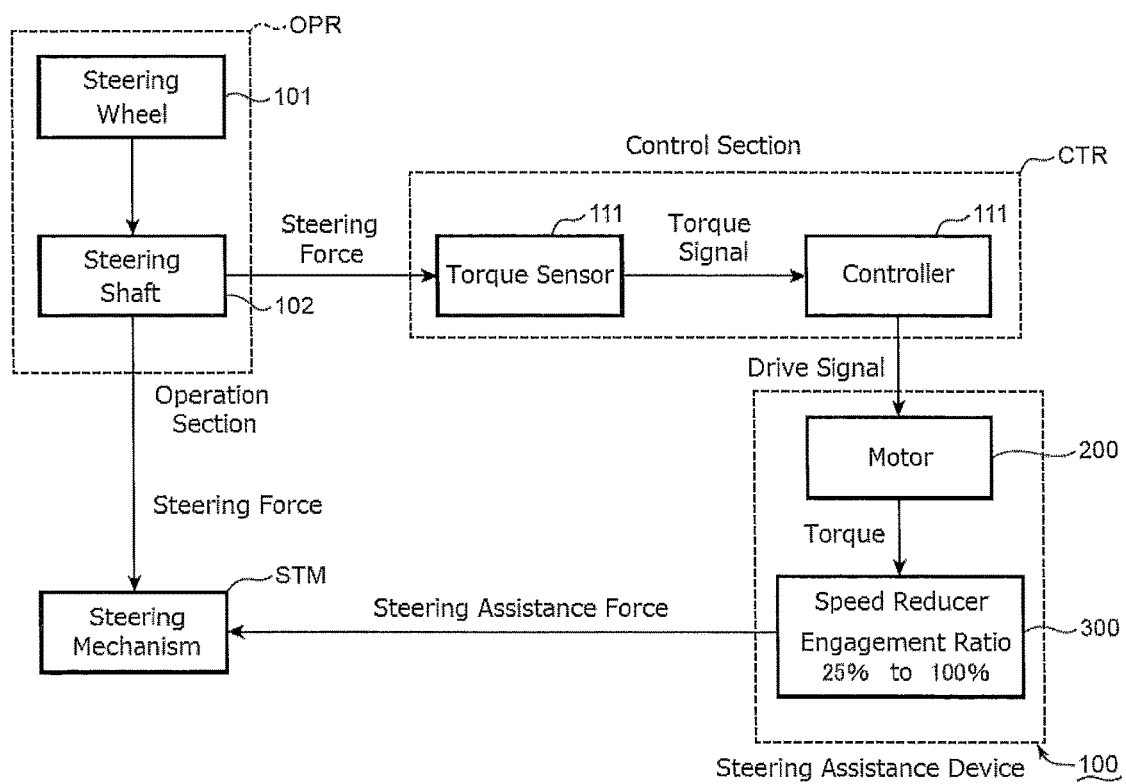
FIG. 1 is a schematic block diagram showing a steering assistance device according to the first embodiment.

FIG. 1 is a schematic block diagram showing a steering assistance device 100 according to the first embodiment. The steering assistance device 100 will be described with reference to FIG. 1.

In addition to the steering assistance device 100, FIG. 1 also shows an operation section OPR, a control section CTR, and a steering mechanism STM. Various technologies used for conventional vehicles may be applied to the operation section OPR, the control section CTR, and the steering mechanism STM. The principle of this embodiment will not be limited to particular technologies applied to the operation section OPR, the control section CTR, and the steering mechanism STM.

The operation section OPR may include a steering wheel 101 and a steering shaft 102. A driver may grip the steering wheel 101. To steer the vehicle (not shown), the driver may rotate the steering wheel 101. The steering shaft 102 may be mechanically connected to the steering wheel 101 and the steering mechanism STM. The steering force applied to the steering wheel 101 by the rotational operation of the driver may be transmitted to the steering mechanism STM through the steering shaft 102.

The steering mechanism STM may transmit the steering force to tires (not shown) of the vehicle to steer the tires of the vehicle. When a large force is required to steer the tires, the driver may rotate the steering wheel 101 with a large steering force. At this time, a large torque may be produced in the steering shaft 102. When a large force is not required to steer the tires, the driver may rotate the steering wheel 101 with a small steering force. At this time, a small torque may be produced in the steering shaft 102. Various known design techniques used for vehicles may be applied to the mechanical connection between the steering wheel 101, steering shaft 102, the steering mechanism STM, and the tires. The principle of this embodiment will not be limited to particular connection from the steering wheel 101 to the tires.

The control section CTR may include a torque sensor 111 and a controller 112. The torque sensor 111 may detect a torque produced in a steering shaft 102. The known torque detecting techniques may be applied to the torque sensor 111. The principle of this embodiment will not be limited to a particular type of the torque sensor 111.

If it is required that the torque sensor 111 be directly connected to the steering shaft 102 so as to detect the torque produced in the steering shaft 102, the torque sensor 111 may be mechanically connected to the steering shaft 102. In other cases, the torque sensor 111 may not be directly connected to the steering shaft 102. The mechanism or electrical connection between the torque sensor 111 and the steering shaft 102 may depend on the performance of the torque sensor 111. Accordingly, the principle of this embodiment will not be limited to particular connection between the steering shaft 102 and the torque sensor 111.

The torque sensor 111 may detect a torque produced in the steering shaft 102 and generate a torque signal. When a large torque is produced in the steering shaft 102, the torque signal may represent the large torque. When a small torque is produced in the steering shaft 102, the torque signal may represent the small torque. The torque signal may be output from the torque sensor 111 to the controller 112.

The controller 112 may control the steering assistance device 100 in accordance with the torque signal. When the torque signal represents a large torque, the controller 112 may cause the steering assistance device 100 to output a large steering assistance force. When the torque signal represents a small torque, the controller 112 may cause the steering assistance device 100 to output a small steering assistance force. The steering assistance force may be transmitted to the steering mechanism STM. As a result, the driver can steer the vehicle with a small force. The controller 112 may use various known calculation techniques to process the torque signal and generate a drive signal for driving the steering assistance device 100. The principle of this embodiment will not be limited by a particular calculation process performed by the controller 112.

The controller 112 may be a microcomputer or other arithmetic circuits for arithmetic processing using a torque signal. The principle of this embodiment will not be limited to a particular device and/or a circuit used as the controller 112.

The steering assistance device 100 may include a motor 200 and a speed reducer 300. The above drive signal may be output from the controller 112 to the motor 200. The motor 200 may rotate in accordance with the drive signal and output a torque designated by the drive signal. Therefore, the torque output from the motor 200 may vary in accordance with the steering force applied to the steering shaft 102. When a large steering force is applied to the steering shaft 102, the motor 200 may output a large torque. When a small steering force is applied to the steering shaft 102, the motor 200 may output a small torque. In the embodiment, the torque output by the motor 200 is an example of the drive force.

The torque may be output from the motor 200 to the speed reducer 300. The speed reducer 300 may enlarge the torque from the motor 200 to produce the steering assistance force. The steering assistance force may be output to the steering mechanism STM. As a result, the driver may be assisted by the steering assistance force to steer the vehicle with a small force.

The speed reducer 300 may include a gear section (not shown) and an internally toothed ring (not shown). The gear section may rotate and oscillate in accordance with the torque from the motor 200. The internally toothed ring may include internal teeth arranged circularly around the gear section. The speed reducer 300 may be designed so as to achieve an engagement ratio of 25 to 100% between the gear section and the internally toothed ring. The engagement ratio in conventional planetary gears is several percent, while the engagement ratio of the speed reducer 300 of this embodiment may be 25 to 100%. Therefore, even when the speed reducer 300 is under a high load, the steering assistance device 100 can output the steering assistance force properly.

The above gear section may include one or more gear elements. The principle of this embodiment will not be limited to a particular number of gear elements included in the gear section.

The gear elements included in the gear section may be trochoid gears. In this case, the backlash between the gear section and the internally toothed ring may be very small. Therefore, the steering assistance device 100 can output the steering assistance force smoothly. Alternatively, the gear elements included in the gear section may be other types of gears. The principle of this embodiment is not limited to a particular type of gear elements included in the gear section.

The motor 200 may be directly connected to the speed reducer 300. Alternatively, a transmission mechanism (e.g., a mechanism constructed with gears, pulleys, and/or a belt) designed to transmit a torque may be arranged between the motor 200 and the speed reducer 300. The principle of this embodiment will not be limited to a particular connection between the motor 200 and the speed reducer 300.

Second Embodiment

A design engineer can construct various structures for steering the tires based on the design principle described for the first embodiment. For the second embodiment, an example of structure for steering the tires will be described.

Figure 2:
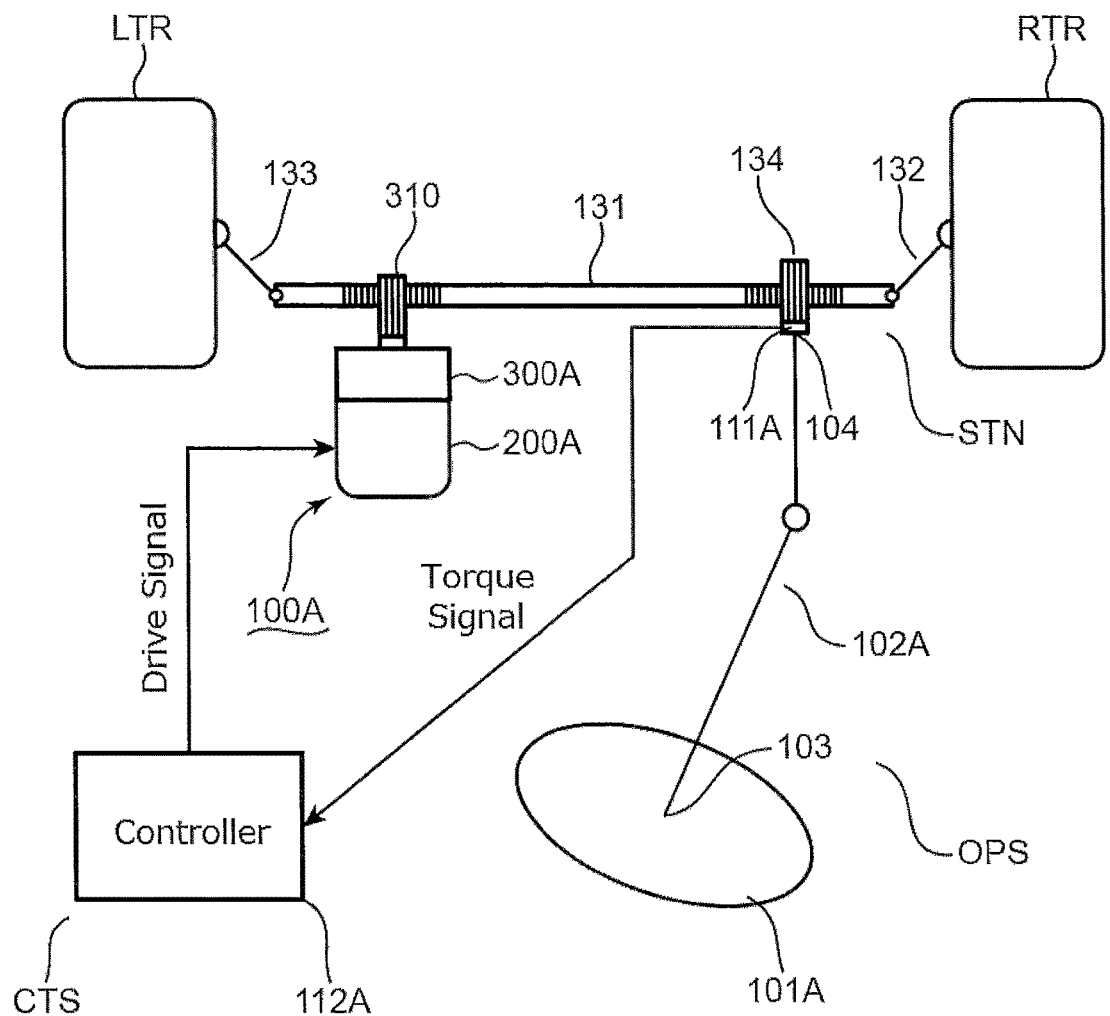
FIG. 2 is a schematic layout of a steering assistance device according to the second embodiment.

FIG. 2 is a schematic layout of a steering assistance device 100A according to the second embodiment. The steering assistance device 100A will be described with reference to FIGS. 1 and 2.

In addition to the steering assistance device 100A, FIG. 2 also shows a right tire RTR, a left tire LTR, a steering mechanism STN, an operation section OPS, and a control section CTS. The steering mechanism STN may be used as the steering mechanism STM described with reference to FIG. 1. Therefore, the description about the steering mechanism STM of the first embodiment may be applied to the steering mechanism STN. The operation section OPS may be used as the operation section OPR described with reference to FIG. 1. Therefore, the description about the operation section OPR of the first embodiment may be applied to the operation section OPS. The control section CTS may be used as the control section CTR described with reference to FIG. 1. Therefore, the description about the control section CTR of the first embodiment may be applied to the control section CTS.

The steering mechanism STN may include a rack 131, a right link mechanism 132, a left link mechanism 133, and a primary pinion 134. The rack 131 may extend between the right tire RTR and the left tire LTR. The rack 131 may be shifted rightward or leftward in accordance with operation of the operation section OPS by the driver. The right link mechanism 132 may be connected to the right end of the rack 131 and the right tire RTR. When the rack 131 is shifted rightward, the right link mechanism 132 may rotate the right tire RTR clockwise or counterclockwise in a horizontal plane. When the rack 131 is shifted leftward, the right link mechanism 132 may rotate the right tire RTR counterclockwise or clockwise in a horizontal plane. The left link mechanism 133 may be connected to the left end of the rack 131 and the left tire LTR. When the rack 131 is shifted rightward, the left link mechanism 133 may rotate the left tire LTR clockwise or counterclockwise in a horizontal plane. When the rack 131 is shifted leftward, the left link mechanism 133 may rotate the left tire LTR counterclockwise or clockwise in a horizontal plane. Various known structures can be applied to the rack 131, the right link mechanism 132, and the left link mechanism 133. Accordingly, the principle of this embodiment will not be limited to particular structure constructed with the rack 131, the right link mechanism 132, and the left link mechanism 133. In the embodiment, the right tire RTR and the left tire LTR are examples of wheels.

The primary pinion 134 may be connected to the operation section OPS and the rack 131. The primary pinion 134 may be rotated in accordance with the steering force applied by the operation section OPS. As a result, the rack 131 meshing with the primary pinion 134 may be shifted rightward or leftward.

The operation section OPS may include a steering wheel 101A and a steering shaft 102A. The steering wheel 101A may be used as the steering wheel 101 described with reference to FIG. 1. Therefore, the description about the steering wheel 101 of the first embodiment may be applied to the steering wheel 101A. The steering shaft 102A may be used as the steering shaft 102 described with reference to FIG. 1. Therefore, the description about the steering shaft 102 of the first embodiment may be applied to the steering shaft 102A.

The steering shaft 102A may include a proximal end portion 103 and a distal end portion 104. The steering wheel 101A may be connected to the proximal end portion 103 of the steering shaft 102A. The primary pinion 134 of the steering mechanism STN may be mounted on the distal end portion 104 of the steering shaft 102A. When the driver rotates the steering wheel 101A, the steering shaft 102A may also rotate. As a result, the primary pinion 134 connected to the distal end portion 104 of the steering shaft 102A may also rotate. The rack 131 meshing with the primary pinion 134 may be shifted rightward or leftward in accordance with the rotation of the primary pinion 134.

The control section CTS may include a torque sensor 111A and a controller 112A. The torque sensor 111A may be used as the torque sensor 111 described with reference to FIG. 1. Therefore, the description about the torque sensor 111 of the first embodiment may be applied to the torque sensor 111A. The controller 112A may be used as the controller 112 described with reference to FIG. 1. Therefore, the description about the controller 112 of the first embodiment may be applied to the controller 112A.

The torque sensor 111A may be placed on the distal end portion 104 of the steering shaft 102A. The torque sensor 111A may detect a torque produced in the distal end portion 104 of the steering shaft 102A and generate a torque signal. The torque signal may be output from the torque sensor 111A to the controller 112A. The controller 112A may generate a drive signal in accordance with the torque signal. The drive signal may be output to the steering assistance device 100A.

The steering assistance device 100A may include a motor 200A and a speed reducer 300A. The motor 200A may be used as the motor 200 described with reference to FIG. 1. Therefore, the description about the motor 200 of the first embodiment may be applied to the motor 200A. The speed reducer 300A may be used as the speed reducer 300 described with reference to FIG. 1. Therefore, the description about the speed reducer 300 of the first embodiment may be applied to the speed reducer 300A.

The motor 200A may be directly connected to the speed reducer 300A. The motor 200A may mesh with a gear structure in the speed reducer 300A and output a torque designated by the drive signal to the speed reducer 300A. The speed reducer 300A may enlarge the torque transmitted from the motor 200A.

The speed reducer 300A may include a secondary pinion 310 meshing with the rack 131 of the steering mechanism STN. The secondary pinion 310 may transmit the enlarged torque to the rack 131. As a result, the rotational motion of the secondary pinion 310 may be converted into a rightward or leftward linear motion of the rack 131. In the embodiment, the secondary pinion 310 is an example of a motion converting section. Alternatively, the motion converting section may be other mechanism elements (e.g., a cam) contributing to conversion of the rotational motion into a linear motion.

Third Embodiment

The steering assistance device may be installed on a vehicle such that the rotation center axis of the steering assistance device substantially corresponds to the rotation center axis of the steering shaft. In this case, the space for installation of the steering assistance device may at least partially used as the space for installation of the steering shaft, and therefore, a design engineer can arrange the steering assistance device using a small space in the vehicle. In the third embodiment, an example of the steering assistance device that rotates coaxially with the rotation of the steering shaft will be described.

Figure 3:
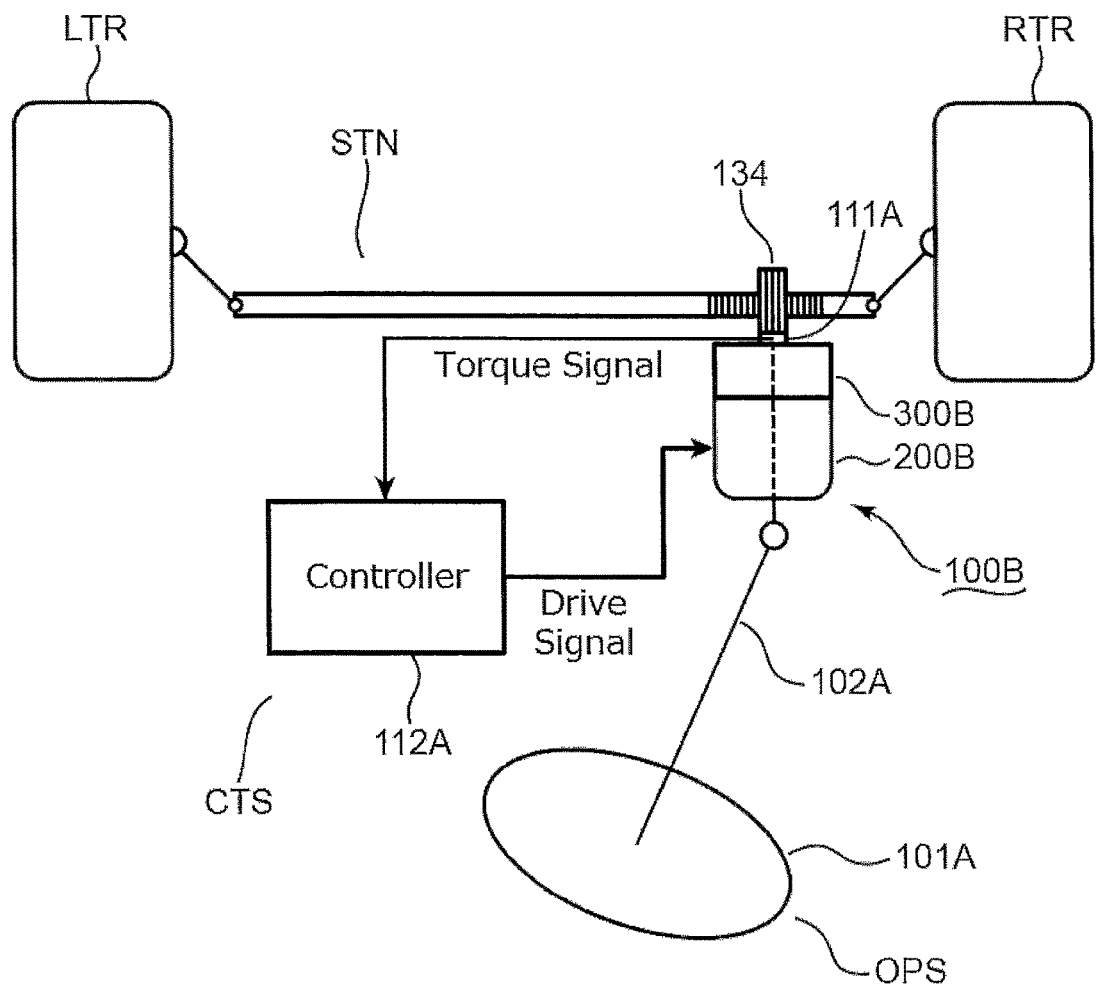
FIG. 3 is a schematic layout of a steering assistance device according to the third embodiment.

FIG. 3 is a schematic layout of a steering assistance device 100B according to the third embodiment. The same reference signs as for the second embodiment indicates that the elements denoted by these reference signs are the same as those in the second embodiment. Therefore, the description about the second embodiment may be applied to the elements denoted by the same reference signs. The steering assistance device 100B will be described with reference to FIGS. 1 and 3.

FIG. 3 shows the right tire RTR, the left tire LTR, the steering mechanism STN, the operation section OPS, and the control section CTS. The description about the second embodiment may be applied to these elements.

The steering assistance device 100B may include a motor 200B and a speed reducer 300B. The motor 200B may be used as the motor 200 described with reference to FIG. 1. Therefore, the description about the motor 200 of the first embodiment may be applied to the motor 200B. The speed reducer 300B may be used as the speed reducer 300 described with reference to FIG. 1. Therefore, the description about the speed reducer 300 of the first embodiment may be applied to the speed reducer 300B.

The motor 200B and the speed reducer 300B may be designed such that the steering shaft 102A of the operation section OPS extends through the steering assistance device 100B and is connected to the primary pinion 134 of the steering mechanism STN. The speed reducer 300B may include a rotational element that meshes with the steering shaft 102A. The speed reducer 300B may enlarge the torque output from the motor 200B and output the enlarged torque (that is, the steering assistance force) to the steering shaft 102A.

When the driver rotates the steering wheel 101A, a torque may be produced in the steering shaft 102A. The torque sensor 111A of the control section CTS may generate a torque signal representing the torque produced in the steering shaft 102A. The torque signal may be output from the torque sensor 111A to the controller 112A. The controller 112A may generate a drive signal in accordance with the torque signal. The drive signal may be output from the controller 112A to the motor 200B. The motor 200B may rotate in accordance with the drive signal and output a torque to the speed reducer 300B. The speed reducer 300B may enlarge the torque from the motor 200B and output the enlarged torque to the steering shaft 102A as a steering assistance force. As a result, the driver may be assisted by the steering assistance force to operate the steering wheel 101A.

Fourth Embodiment

A design engineer can provide the steering assistance device with various structures. In the fourth embodiment, an example of the steering assistance device will be described.

Figure 4:
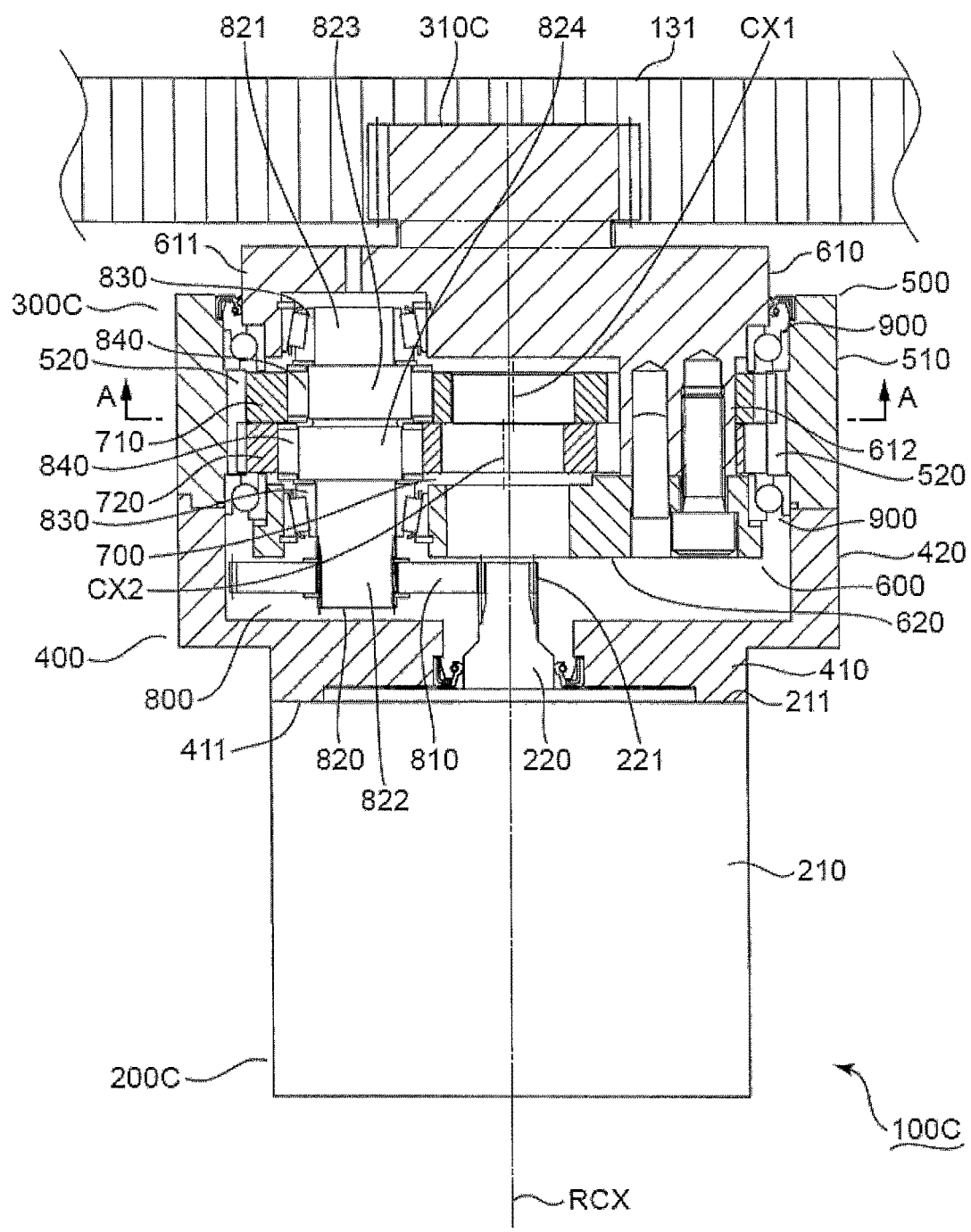
FIG. 4 is a schematic partially sectional view of a steering assistance device according to the fourth embodiment.

FIG. 4 is a schematic partially sectional view of a steering assistance device 100C according to the fourth embodiment. The steering assistance device 100C will be described with reference to FIGS. 2 and 4.

The steering assistance device 100C may include a motor 200C, a speed reducer 300C, and a mounting cylinder 400. The mounting cylinder 400 may be used to mount the motor 200C on the speed reducer 300C. The motor 200C may be used as the motor 200A described with reference to FIG. 2. Therefore, the description about the motor 200A of the second embodiment may be applied to the motor 200C. The speed reducer 300C may be used as the speed reducer 300A described with reference to FIG. 2. Therefore, the description about the speed reducer 300A of the second embodiment may be applied to the speed reducer 300C.

The motor 200C may include a casing 210 and a motor shaft 220. In the casing 210, there may be arranged various components used in conventional motors (e.g., a coil or a stator core). The principle of this embodiment is not limited to particular structure in the casing 210.

The casing 210 may include a mounting surface 211 on which the mounting cylinder 400 is mounted. The motor shaft 220 may extend from the mounting surface 211 toward the speed reducer 300C. On the end of the motor shaft 220, there may be formed a gear section 221. The gear section 221 may mesh with the speed reducer 300C. As a result, the torque produced by the motor 200C may be transmitted to the speed reducer 300C.

The mounting cylinder 400 may include a mounting wall 410 and a peripheral wall 420. The mounting wall 410 may include a contact surface 411 contacting with the mounting surface 211 of the motor 200C. The contact surface 411 may have a complementary shape to the surface of the mounting surface 211. Therefore, the contact surface 411 may be tightly contacted with the mounting surface 211. The motor 200C may be fixed on the contact surface 411 by screwing or other appropriate fixing techniques.

The peripheral wall 420 may constitute a cylinder projecting from the mounting wall 410 toward the speed reducer 300C. The peripheral wall 420 may be connected to the speed reducer 300C by screwing or other appropriate connection techniques.

The peripheral wall 420 may encircle the motor shaft 220. Therefore, the mounting cylinder 400 can suitably protect the connection between the motor 200C and the speed reducer 300C against foreign substances or other failure factors. The peripheral wall 420 and/or the motor 200C may be fixed on a vehicle on which the steering assistance device 100C is installed.

Figure 5:
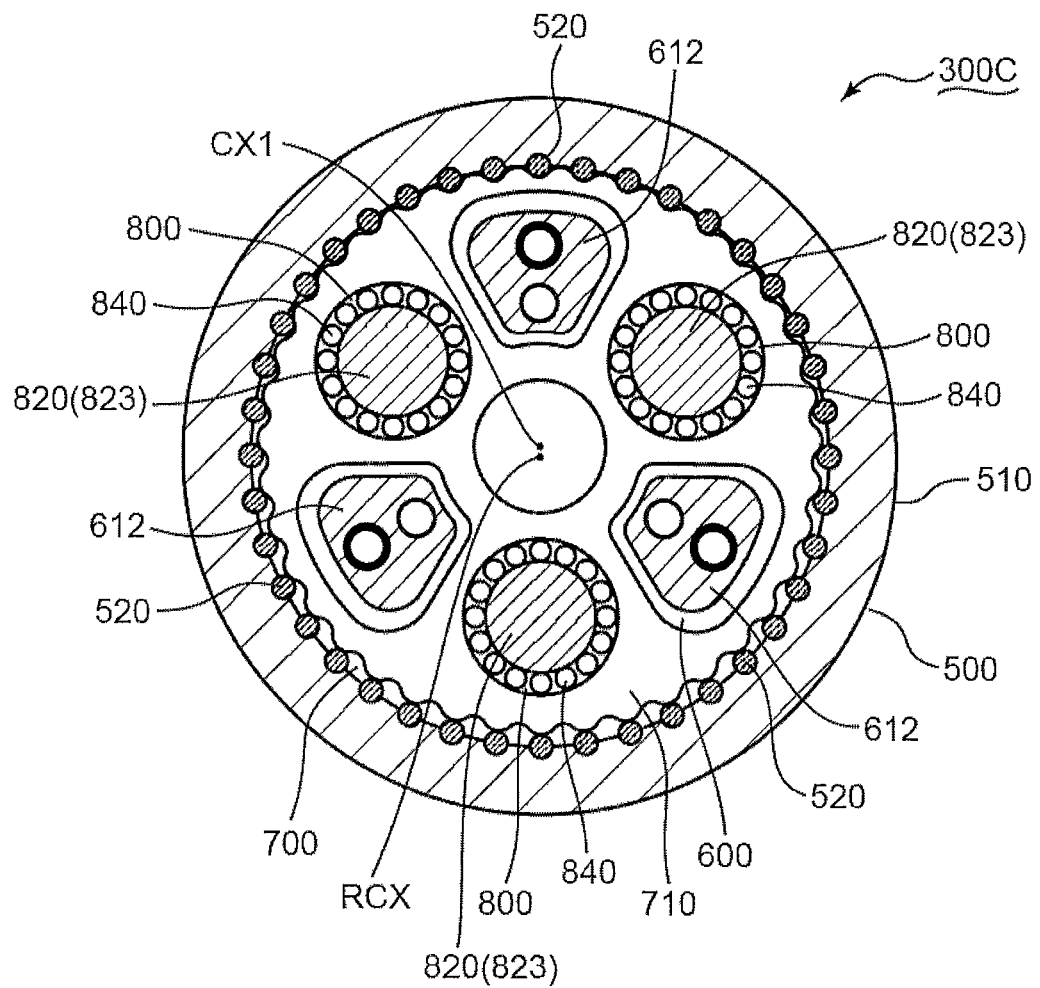
FIG. 5 is a schematic sectional view of a steering assistance device of FIG. 4.

FIG. 5 is a schematic sectional view of the speed reducer 300C along the line A-A in FIG. 4. The same reference signs as for the second embodiment indicates that the elements denoted by these reference signs are the same as those in the second embodiment. Therefore, the description about the second embodiment may be applied to the elements denoted by the same reference signs. The speed reducer 300C will be described with reference to FIGS. 2, 4, and 5.

As shown in FIG. 4, the speed reducer 300C may be arranged between the motor 200C and the rack 131. The speed reducer 300C may include an outer cylinder 500, a carrier 600, a gear section 700, three drive mechanisms 800 (FIG. 4 shows one of the three drive mechanisms 800), two primary bearings 900, and a pinion 310C. The pinion 310C may be used as the secondary pinion 310 described with reference to FIG. 2. Therefore, the description about the secondary pinion 310 of the second embodiment may be applied to the pinion 310C.

As shown in FIG. 5, the outer cylinder 500 may include a case 510 having a substantially cylindrical shape and a plurality of internal tooth pins 520. The case 510 may define a cylindrical internal space in which the carrier 600, the gear section 700, and the drive mechanisms 800 may be arranged. The plurality of internal tooth pins 520 may be arranged circularly along the inner peripheral surface of the case 510 to form an internally toothed ring. In the embodiment, the internal tooth pins 520 are examples of internal teeth.

As shown in FIG. 4, the case 510 may be connected to the end surface of the peripheral wall 420 of the mounting cylinder 400. Therefore, the case 510 may be fixed on the vehicle integrally with the mounting cylinder 400 and the motor 200C. The two primary bearings 900 may be arranged between the outer cylinder 500 and the carrier 600 encircled by the outer cylinder 500. Each of the two primary bearings 900 may enable rotational motion of the carrier 600 in the outer cylinder 500. The carrier 600 may rotate coaxially with the motor shaft 220.

FIGS. 4 and 5 show the rotation center axis RCX of the carrier 600 and the motor shaft 220. Each of the internal tooth pins 520 may be made of a cylindrical member extending along the rotation center axis RCX. Each of the internal tooth pins 520 may be fitted in a groove formed in the inner wall of the case 510. Therefore, each of the internal tooth pins 520 may be appropriately retained by the case 510.

As shown in FIG. 5, the plurality of internal tooth pins 520 may be arranged around the rotation center axis RCX at substantially regular intervals. Each of the internal tooth pins 520 may have a semicircle surface projecting from the inner wall of the case 510 toward the rotation center axis RCX. Therefore, the plurality of internal tooth pins 520 may serve as internal teeth meshing with the gear section 700.

As shown in FIG. 4, the carrier 600 may include a base portion 610 and an end plate portion 620. The base portion 610 may be arranged between the end plate portion 620 and the rack 131. The end plate portion 620 may be arranged between the base portion 610 and the motor 200C. The carrier 600 as a whole may have a cylindrical shape. The carrier 600 may rotate about the rotation center axis RCX in the outer cylinder 500.

The base portion 610 may include a base plate portion 611 (see FIG. 4) and three shaft portions 612 (see FIG. 5). Each of the three shaft portions 612 may extend from the base plate portion 611 toward the end plate portion 620. The end plate portion 620 may be connected to each of the end surfaces of the three shaft portions 612. The end plate portion 620 may be connected to each of the end surfaces of the three shaft portions 612 by a reamer bolt, a locating pin, or other appropriate fixing techniques. The principle of this embodiment will not be limited to a particular connection technique used between the end plate portion 620 and each of the three shaft portions 612.

As shown in FIG. 4, the gear section 700 may be arranged between the base plate portion 611 and the end plate portion 620. The three shaft portions 612 may extend through the gear section 700 and may be connected to the end plate portion 620.

As shown in FIG. 4, the gear section 700 may include a first trochoid gear 710 and a second trochoid gear 720. The first trochoid gear 710 may be arranged between the base plate portion 611 and the second trochoid gear 720. The second trochoid gear 720 may be arranged between the end plate portion 620 and the first trochoid gear 710. The first trochoid gear 710 and the second trochoid gear 720 may be formed based on the same drawing for design.

A part of a plurality of external teeth of the first trochoid gear 710 may mesh with the internally toothed ring formed of the plurality of internal tooth pins 520. The engagement ratio between the first trochoid gear 710 and the internally toothed ring may be set in a range from 12.5 to 50%. The engagement ratio EG1 between the first trochoid gear 710 and the internally toothed ring may also be defined by the following formula.

$$EG1(\%) = \frac{Nc1}{Np} \times 100 \qquad \text{Formula 1}$$

EG1: The engagement ratio between the first trochoid gear and the internally toothed ring
Nc1: The number of internal tooth pins contacted by the first trochoid gear
Np: The total number of internal tooth pins included in the internally toothed ring A part of a plurality of external teeth of the second trochoid gear 720 may mesh with the internally toothed ring formed of the plurality of internal tooth pins 520. The engagement ratio between the second trochoid gear 720 and the internally toothed ring may be set in a range from 12.5 to 50%. The engagement ratio EG2 between the second trochoid gear 720 and the internally toothed ring may also be defined by the following formula.

$$EG2(\%) = \frac{Nc2}{Np} \times 100 \qquad \text{Formula 2}$$

EG2: The engagement ratio between the second trochoid gear and the internally toothed ring
Nc1: The number of internal tooth pins contacted by the second trochoid gear
Np: The total number of internal tooth pins included in the internally toothed ring In the embodiment, both engagement ratios EG1, EG2 may be set at 50%.

The rotation of the motor shaft 220 may be transmitted to the first trochoid gear 710 and the second trochoid gear 720 by the drive mechanisms 800. As a result, the first trochoid gear 710 and the second trochoid gear 720 may rotate and oscillate.

FIG. 4 shows the center axis CX1 of the first trochoid gear 710 and the center axis CX2 of the second trochoid gear 720. The center axes CX1, CX2 may extend substantially in parallel with the rotation center axis RCX of the carrier 600. FIG. 5 shows the center axis CX1 of the first trochoid gear 710. During the rotation and rotation described above, described above, the center axes CX1, CX2 may revolve around the rotation center axis RCX of the carrier 600. Therefore, the first trochoid gear 710 and the second trochoid gear 720 may revolve within the case 510 while meshing with the internal tooth pins 520. Simultaneously, the first trochoid gear 710 and the second trochoid gear 720 may contact with the three shaft portions 612 of the carrier 600 and cause the carrier 600 to rotate around the rotation center axis RCX thereof. In the embodiment, the center axis CX1 of the first trochoid gear 710 is an example of a first center axis, and the center axis CX2 of the second trochoid gear 720 is an example of a second center axis.

The center axis CX2 of the second trochoid gear 720 may revolve around the rotation center axis RCX of the carrier 600 out of phase with the center axis CX1 of the first trochoid gear 710. If the revolution phase of the center axis CX2 of the second trochoid gear 720 lags that of the center axis CX1 of the first trochoid gear 710 by 180°, the engagement ratio EG between the gear section 700 and the internally toothed ring may be defined as the sum of the engagement ratios EG1, EG2, as expressed by the following formula.

$$EG(\%) = EG1 + EG2 = \frac{Nc}{Np} \times 100 \qquad \text{Formula 3}$$

EG: The engagement ratio between the gear section and the internally toothed ring
EG1: The engagement ratio between the first trochoid gear and the internally toothed ring
EG2: The engagement ratio between the second trochoid gear and the internally toothed ring
Nc: The number of internal tooth pins contacted by the gear section
Np: The total number of internal tooth pins included in the internally toothed ring The pinion 310C may project from the base portion 610 in the direction opposite to the direction in which the shaft portions 612 projects, and mesh with the rack 131. As a result, the steering assistance force produced by the motor 200C and the speed reducer 300C may be transmitted to the rack 131. Therefore, the rotational motion of the carrier 600 may be converted into a linear motion of the rack 131. The pinion 310C may be formed integrally with the base portion 610.

As shown in FIG. 4, each of the three drive mechanisms 800 may include an input gear 810, a crank shaft 820, two journal bearings 830, and two crank bearings 840. The input gear 810 may mesh with the gear section 221 of the motor shaft 220 and receive a torque from the motor 200C. Unlike the first trochoid gear 710 and the second trochoid gear 720, the input gear 810 may be a spur wheel. Alternatively, the input gear 810 may be other types of gear components. The principle of this embodiment will not be limited to a particular type of gear component used as the input gear 810.

The reduction ratio determined by the input gear 810 and the gear section 221 of the motor shaft 220 may be smaller than the reduction ratio determined by the above internally toothed ring and the gear section 700. A design engineer designing the steering assistance device 100C may set the reduction ratio between the input gear 810 and the gear section 221 of the motor shaft 220 such that the speed of revolution of the first trochoid gear 710 and the second trochoid gear 720 is not excessively high. In the embodiment, the reduction ratio determined by the input gear 810 and the gear section 221 of the motor shaft 220 is an example of a first reduction ratio, and the reduction ratio determined by the internally toothed ring and the gear section 700 is an example of a second reduction ratio.

The crank shaft 820 may include a first journal 821 (see FIG. 4), a second journal 822 (see FIG. 4), a first eccentric portion 823 (see FIG. 4), and a second eccentric portion 824 (see FIG. 4). The first journal 821 may be encircled by the base plate portion 611 of the carrier 600. The second journal 822 may be encircled by the end plate portion 620 of the carrier 600. One of the two journal bearings 830 may be arranged between the first journal 821 and the base plate portion 611. The other of the two journal bearings 830 may be arranged between the second journal 822 and the end plate portion 620. In addition, the input gear 810 may be mounted on the second journal 822.

The first eccentric portion 823 may be positioned between the first journal 821 and the second eccentric portion 824. The second eccentric portion 824 may be positioned between the second journal 822 and the first eccentric portion 823. One of the two crank bearings 840 may be arranged between the first eccentric portion 823 and the first trochoid gear 710. The other of the two crank bearings 840 may be arranged between the second eccentric portion 824 and the second trochoid gear 720.

The first journal 821 and the second journal 822 may be coaxial with each other and rotate around the common rotation axis. The first eccentric portion 823 and the second eccentric portion 824 may both have a cylindrical shape and may be eccentric to the first journal 821 and the second journal 822. The revolution phase difference between the first trochoid gear 710 and the second trochoid gear 720 may be determined by the first eccentric portion 823 and the second eccentric portion 824.

When the input gear 810 rotates, the crank shaft 820 may rotate. As a result, the first eccentric portion 823 and the second eccentric portion 824 may rotate eccentrically. Simultaneously, the first trochoid gear 710 connected to the first eccentric portion 823 via the crank bearing 840 can revolve within the outer cylinder 500 while meshing with a plurality of internal tooth pins 520. Likewise, the second trochoid gear 720 connected to the second eccentric portion 824 via the crank bearing 840 can revolve within the outer cylinder 500 while meshing with a plurality of internal tooth pins 520. As a result, the first trochoid gear 710 and the second trochoid gear 720 can rotate and oscillate. In the embodiment, the crank shaft 820 and the two crank bearings 840 may be an example of a crank mechanism.

The design principle described for the above various embodiments can be applied to various steering assistance devices. A part of the various features described for any one of the above various embodiments may be applied to the steering assistance device described for another of the embodiments.

The steering assistance device described for the above embodiments may mainly have the following features.

A steering assistance device according to one aspect of the above embodiments comprises: a motor configured to output a drive force in accordance with a steering force applied to a steering shaft; and a speed reducer including: a gear section configured to rotate and oscillate in accordance with the drive force; an outer cylinder having an internally toothed ring formed thereon, the internally toothed ring being configured to mesh with the gear section; and a carrier configured to rotate in accordance with the rotation and oscillation of the gear section and output a steering assistance force to a steering mechanism, the steering mechanism being configured to steer vehicle wheels in accordance with rotational operation applied to a steering wheel. An engagement ratio between the gear section and the internally toothed ring is from 25 to 100%.

In the above arrangement, the engagement ratio between the gear section and the internally toothed ring is from 25 to 100%, and therefore, the steering assistance device can operate properly under a large load.

In the above arrangement, the speed reducer may include: an input gear configured to receive the drive force from the motor; and a crank mechanism configured to transmit the drive force received by the input gear to the gear section, so as to produce the rotation and oscillation, The input gear may reduce a speed of the rotational motion transmitted from the motor at a first reduction ratio. The gear section may reduce the speed of the rotational motion transmitted from the input gear at a second reduction ratio larger than the first reduction ratio.

In this arrangement, the input gear may reduce the speed of the rotational motion transmitted from the motor at a first reduction ratio, and therefore, the gear section may not rotate at an excessively high speed. Therefore, the steering assistance device can transmit a torque from the motor to the steering mechanism at a high efficiency. In addition, a design engineer can design the steering assistance device such that the gear section does not have excessively large dimensions. The gear section reduces the speed of the rotational motion transmitted from the input gear at a second reduction ratio larger than the first reduction ratio, and therefore, the steering assistance device can transmit a large steering assistance force to the steering mechanism.

In the above arrangement, the gear section may include: a first trochoid gear having a first center axis configured to revolve around a rotation center axis of the carrier; and a second trochoid gear having a second center axis configured to revolve around the rotation center axis out of phase with the first center axis.

In this arrangement, the gear section includes a first trochoid gear and a second trochoid gear, and therefore, the torque may be transmitted from the motor to the steering mechanism under a small backlash. The second center axis of the second trochoid gear may revolve around the rotation center axis of the carrier out of phase with the first center axis of the first trochoid gear, and therefore, the gear section as a whole can mesh with the internally toothed ring at a high engagement ratio. Accordingly, even when a high load is applied to the speed reducer, the gear section can remain in mesh with the internally toothed ring and output a large steering assistance force to the steering mechanism.

In the above arrangement, an engagement ratio between the first trochoid gear and the internally toothed ring may be from 12.5 to 50%. An engagement ratio between the second trochoid gear and the internally toothed ring may be from 12.5 to 50%.

In this arrangement, the first trochoid gear and the second trochoid gear may mesh with the internally toothed ring at engagement ratios from 12.5 to 50%, and therefore, even when a high load is applied to the speed reducer, the gear section can remain in mesh with the internally toothed ring and output a large steering assistance force to the steering mechanism.

In the above arrangement, the input gear may have a different tooth shape than the first trochoid gear and the second trochoid gear.

In this arrangement, the input gear may have a different tooth shape than the first trochoid gear and the second trochoid gear, and therefore, a design engineer can configure the torque transmission mechanism from the motor to the input gear in various structures.

In the above arrangement, the motor may include a motor shaft configured to mesh with the input gear.

In this arrangement, the motor shaft of the motor may mesh with the input gear, and therefore, a design engineer can design the steering assistance device in small dimensions.

In the above arrangement, the motor may be fixed on the outer cylinder.

In this arrangement, the motor may be fixed on the outer cylinder, and therefore, a design engineer can design the steering assistance device in small dimensions.

In the above arrangement, the internally toothed ring may include a number N of internal teeth. The engagement ratio may be defined by the following formula.

$$\text{Engagement ratio}(\%) = \frac{\text{The number of internal teeth contacted by the gear section}}{N} \times 100 \qquad \text{Formula 4}$$

In this arrangement, the engagement ratio defined by Formula 4 may be from 25 to 100%, and therefore, the steering assistance device can operate properly under a large load.

In the above arrangement, the speed reducer may include a motion converting section configured to convert the rotational motion of the carrier into a linear motion in cooperation with the steering mechanism.

In the above arrangement, the motion converting section may convert the rotational motion of the carrier into a linear motion in cooperation with the steering mechanism, and therefore, the steering assistance device can suitably contribute to adjustment of the directions of the vehicle wheels.

In the above arrangement, the steering mechanism may include a rack. The motion converting section may include a pinion projecting from the carrier. The pinion may mesh with the rack.

In this arrangement, the pinion projecting from the carrier may mesh with the rack of the steering mechanism and convert the rotational motion of the carrier into a linear motion, and therefore, the steering assistance device can suitably contribute to adjustment of the directions of the vehicle wheels.

In the above arrangement, the pinion may be formed integrally with the carrier.

In this arrangement, the pinion may be formed integrally with the carrier, and therefore, there will be less failures of the steering assistance device caused by unintended separation of the pinion from the carrier.

INDUSTRIAL APPLICABILITY

The principle of the above embodiments may be suitably used for design of various vehicles.

What is claimed is:

1. A steering assistance device, comprising:
   a motor configured to output a drive force in accordance with a steering force applied to a steering shaft; and
   a speed reducer including:
      a gear section configured to rotate in accordance with the drive force;
      an outer cylinder having an internally toothed ring formed thereon, the internally toothed ring being configured to mesh with the gear section; and
      a carrier configured to rotate in accordance with rotation of the gear section and output a steering assistance force to a steering mechanism, the steering mechanism being configured to steer vehicle wheels in accordance with rotational operation applied to a steering wheel,
   wherein the gear section revolves within a case of the outer cylinder while meshing with the internally toothed ring during the rotation of the gear section,
   wherein an engagement ratio between the gear section and the internally toothed ring is from 25 to 100%, and
   wherein the speed reducer includes:
      an input gear configured to receive the drive force from the motor; and
      a crank mechanism configured to transmit the drive force received by the input gear to the gear section, so as to produce the rotation,
   wherein the input gear reduces a speed of the rotational motion transmitted from the motor at a first reduction ratio, and
   wherein the gear section reduces the speed of the rotational motion transmitted from the input gear at a second reduction ratio larger than the first reduction ratio.

2. The steering assistance device of claim 1, wherein the gear section includes:
   a first trochoid gear having a first center axis configured to revolve around a rotation center axis of the carrier; and
   a second trochoid gear having a second center axis configured to revolve around the rotation center axis out of phase with the first center axis.

3. The steering assistance device of claim 2, wherein an engagement ratio between the first trochoid gear and the internally toothed ring is from 12.5 to 50%, and
   wherein an engagement ratio between the second trochoid gear and the internally toothed ring is from 12.5 to 50%.

4. The steering assistance device of claim 2, wherein the input gear has a different tooth shape than the first trochoid gear and the second trochoid gear.

5. The steering assistance device of claim 1, wherein the motor includes a motor shaft configured to mesh with the input gear.

6. The steering assistance device of claim 1, wherein the motor is fixed on the outer cylinder.

7. The steering assistance device of claim 1, wherein the internally toothed ring includes a number N of internal teeth, and
   wherein the engagement ratio is defined by Formula 1

$$\text{Engagement ratio}(\%) = \frac{\text{The number of internal teeth contacted by the gear section}}{N} \times 100. \qquad \text{Formula 1}$$

8. The steering assistance device of claim 1, wherein the speed reducer includes a motion converting section configured to convert the rotational motion of the carrier into a linear motion in cooperation with the steering mechanism.

9. The steering assistance device of claim 8, wherein the steering mechanism includes a rack,
   wherein the motion converting section includes a pinion projecting from the carrier, and
   wherein the pinion meshes with the rack.

10. The steering assistance device of claim 9, wherein the pinion is formed integrally with the carrier.

* * * * *